United States Patent
Urbach

[11] Patent Number: 5,380,114
[45] Date of Patent: Jan. 10, 1995

[54] BALL JOINT ASSEMBLY AND METHOD OF MOUNTING

[75] Inventor: Brian A. Urbach, Rochester Hills, Mich.

[73] Assignee: TRW Inc., Lyndhurst, Ohio

[21] Appl. No.: 8,695

[22] Filed: Jan. 25, 1993

[51] Int. Cl.[6] .............................................. F16C 11/00
[52] U.S. Cl. ..................................... 403/140; 403/135; 403/134
[58] Field of Search ............... 403/132, 133, 134, 135, 403/136, 137, 140, 273, 282; 277/212 FB; 29/441.1, 442, 525

[56] References Cited

U.S. PATENT DOCUMENTS

| | | | |
|---|---|---|---|
| 2,618,049 | 11/1952 | Flumerfelt | 29/441.1 |
| 3,197,842 | 8/1965 | Parker | 29/441.1 |
| 3,248,955 | 5/1966 | Templeton | 403/134 |
| 3,343,855 | 9/1967 | Husen . | |
| 3,343,857 | 9/1967 | Cislo | 403/140 |
| 3,381,987 | 5/1968 | Husen | 403/51 |
| 3,472,331 | 10/1969 | Baker et al. . | |
| 3,901,518 | 8/1975 | Uchida . | |
| 4,283,833 | 8/1981 | Pyles | 29/441.1 |
| 4,559,692 | 12/1985 | Morin | 29/441.1 |
| 5,066,159 | 11/1991 | Urbach . | |

Primary Examiner—Randolph A. Reese
Assistant Examiner—Anthony Knight
Attorney, Agent, or Firm—Tarolli, Sundheim & Covell

[57] ABSTRACT

An improved ball joint assembly (10) includes a housing (12) which defines a socket chamber (18) having an opening (32). A ball stud (24) has a ball portion which is disposed in the socket chamber and a shank portion (30) which projects through the opening. A seal assembly (40) seals the opening (32) through which the ball stud (24) extends. The seal assembly (40) includes a flexible wall (42) which sealingly engages the shank portion (30) of the ball stud (24) and a retainer ring (50) which is connected with the flexible wall (42) and is disposed in engagement with a flange (16) on the housing (12). The retainer ring (50) extends outwardly of the flange (16) to enable a press-in-tool (66) to press against the retainer ring to press the housing (12) into an opening (68) in a receiving member (70).

6 Claims, 1 Drawing Sheet

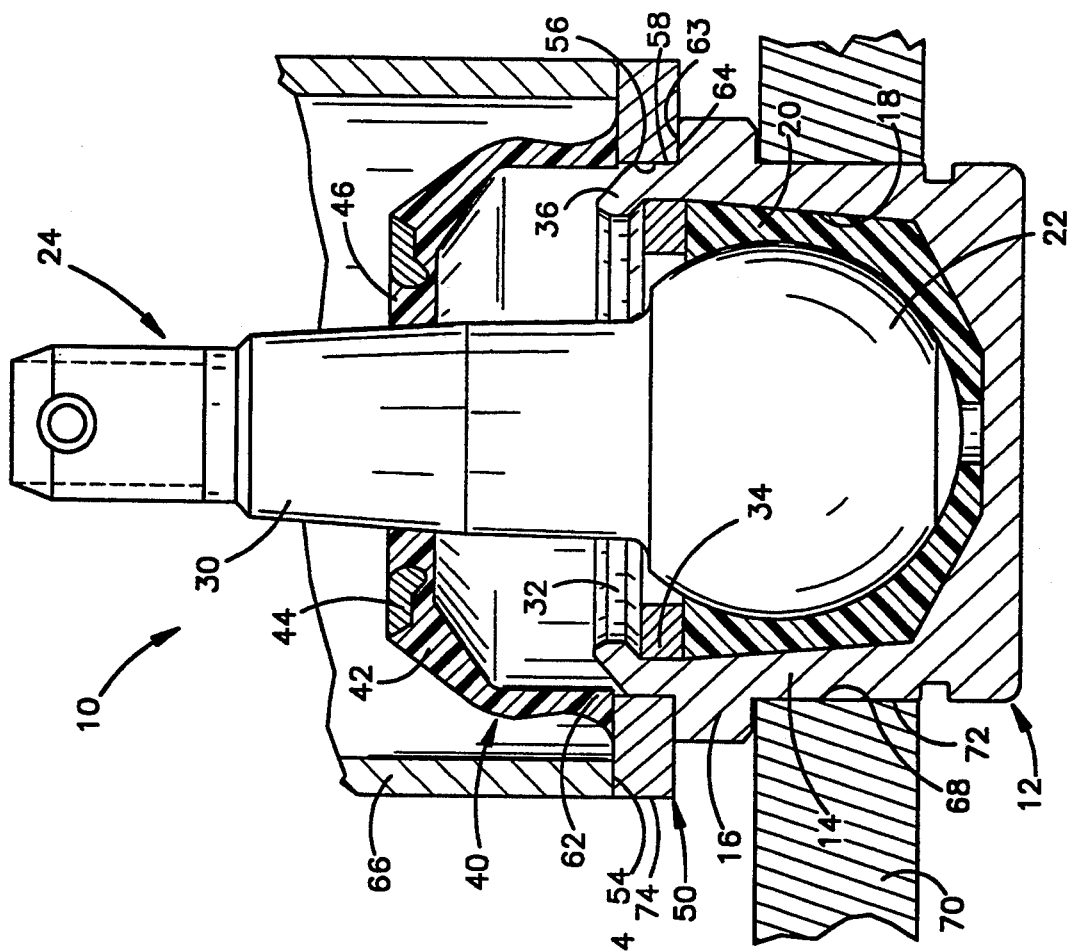
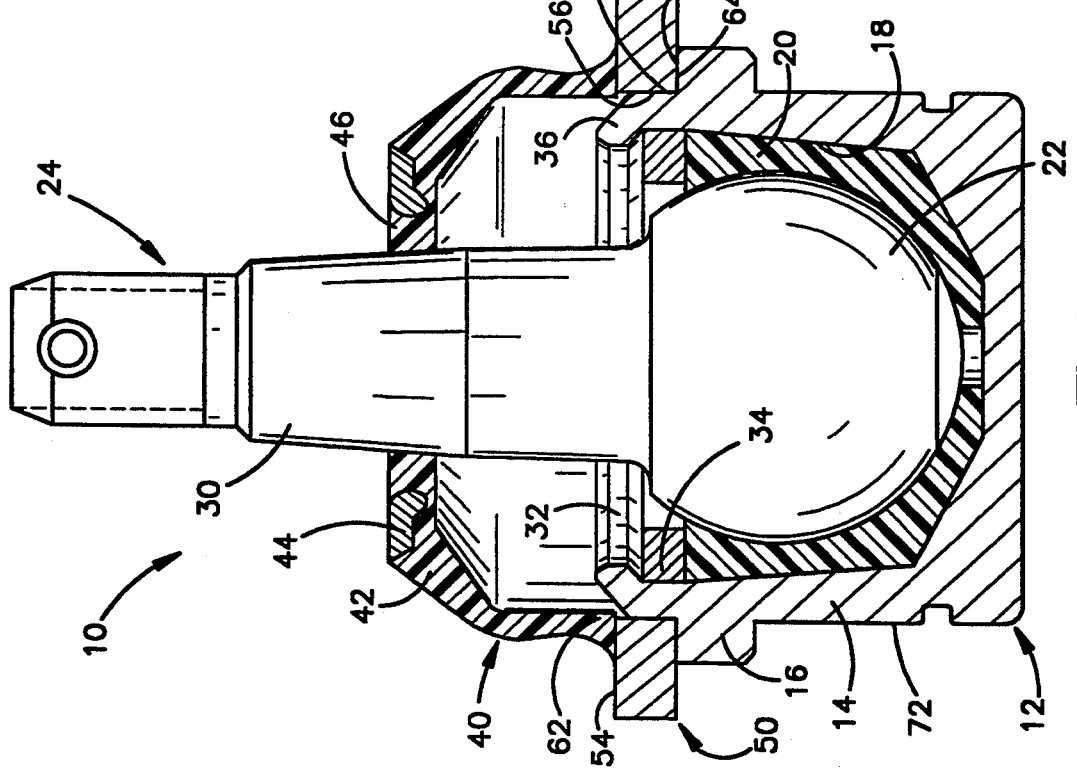

BALL JOINT ASSEMBLY AND METHOD OF MOUNTING

BACKGROUND OF THE INVENTION

1. Technical Field

The present invention relates to a ball joint assembly and the method by which it is mounted in a receiving member.

2. Description of the Prior Art

A known ball joint assembly has a socket housing with an annular flange. A seal mates with the flange to close an opening through which the shank of a ball stud extends. When the ball joint assembly is to be mounted in a receiving member, force is applied against the flange by a press-in-tool to force the ball joint assembly into an opening in the receiving member. This requires that the flange be sufficiently large so that an area outside of the seal can be engaged by the press-in-tool to press the ball joint assembly into the receiving member.

The relatively large flange on the housing of this known ball joint assembly limits manufacturing options in the making of the housing. With the large flange, coldheading becomes difficult or impossible. While the housing could be machined, the cost is prohibitive due to the amount of material being removed to form the relatively large flange.

SUMMARY OF THE INVENTION

An improved ball joint assembly has a socket housing which defines a socket chamber in which a ball portion of a ball stud is received. A shank portion of the ball stud projects through an opening to the socket chamber. A seal assembly seals the opening to the socket chamber.

The seal assembly includes a flexible seal wall portion and a retainer ring. The retainer ring connects the flexible seal wall portion with the housing. The retainer ring is disposed in engagement with a flange on the housing. A press-in-tool engages the retainer ring and presses the housing into an opening in a receiving member.

BRIEF DESCRIPTION OF THE DRAWINGS

Further features of the present invention will become apparent to those skilled in the art to which the present invention relates from reading the following specification with reference to the drawings, in which:

FIG. 1 is a sectional view of a ball joint assembly constructed in accordance with the present invention; and FIG. 2 is a sectional view illustrating the manner in which the ball joint assembly of FIG. 1 is mounted in a receiving member.

DESCRIPTION OF A PREFERRED EMBODIMENT OF THE INVENTION

A ball joint assembly 10 constructed in accordance with the present invention is illustrated in FIG. 1. The ball joint assembly 10 includes a rigid metal housing 12 having a cylindrical side wall 14 and an annular mounting flange 16. The housing 12 defines a generally cylindrical socket chamber 18 within which is located a bearing 20. The housing 12 is preferably cold formed or screw machined as one piece from SAE grade 1008 or 1010 steel which is available from LTV Steel. The bearing 20 is preferably made of injection molded Delrin (Trademark) 500CL, 500 or 100 plastic which is available from E. I. DuPont de Nemours & Co.

The bearing 20 supports a spherical ball portion 22 of a ball stud 24. The bearing 20 supports the ball stud 24 for limited rotation and pivoting movement. The ball stud 24 is preferably coldheaded or screw machined and then carburized. The ball stud 24 is made of SAE grade 8115M or 15 steel which is available from LTV Steel.

A shank portion 30 of the ball stud 24 projects through a circular opening 32 formed in the upper (as viewed in FIG. 1) end portion of the housing 12. An annular metal ring 34 is held in the socket chamber 18 by a radially inturned circular flange portion 36 of the housing 12.

A seal assembly 40 seals the opening 32 between the ball stud 24 and housing 12. The seal assembly 40 includes a flexible wall 42 formed of a suitable polymeric material, such as Compound #1806-85A urethane available from Trostel. An annular metal reinforcing ring 44 holds an axially outer end portion 46 of the flexible wall 42 in sealing engagement with the shank 30 of the ball stud 24.

A rigid annular metal retaining ring 50 connects a lower portion of the flexible wall 42 with the housing 12. Thus, the flexible wall 42 is bonded to an axially outwardly facing flat annular side surface 54 of the retainer ring 50. A circular inner side surface 56 of the retainer ring 50 has an interference fit with and sealingly engages a cylindrical outer side surface 58 of the housing 12. The retainer ring 50 may be machined or cold formed from SAE grade 1008 or 1010 steel which is available from LTV Steel.

An annular lower end portion 62 of the flexible wall 42 is bonded to the flat annular side surface 54 of the retainer ring 50. It is contemplated that the flexible wall 42 of the seal assembly 40 could be connected with the retainer ring 50 in a different manner if desired. Thus, a mechanical connection could be provided between the flexible wall 42 and the retainer ring 50. It is also contemplated that the retainer ring 50 could be at least partially enclosed by a thin layer of the polymeric material forming the flexible wall 42.

In accordance with one of the features of the invention, the retainer ring 50 extends radially outwardly of the socket housing flange 16. During mounting of the seal assembly 40 on the housing 12, a press-in-tool applies force against the retainer ring 50 at a location outwardly of the connection between the flexible wall 40 and the retainer ring. The force applied to the retainer ring 50 moves the retainer ring axially downwardly (as viewed in FIG. 1) onto the socket housing 12. A flat annular lower side surface 63 on the retainer ring 50 moves into engagement with a flat annular upper side surface 64 on the flange 16. The interference fit between the cylindrical side surface 56 of the retainer ring 50 and the cylindrical side surface 58 of the housing 12, securely interconnects the seal assembly 40 and the housing.

In accordance with a feature of the invention, a press-in-tool 66 (shown schematically in FIG. 2) can engage the retainer ring 50 in the seal assembly 40 to press the socket housing 12 into a cylindrical opening 68 formed in a receiving member 70. A cylindrical outer side surface 72 of the housing 12 has an interference fit with the opening 68. The press-in-tool 66 presses against the retainer ring 50. Force is transmitted from the lower side surface 63 of the retainer ring 50 to the upper side surface 64 of the flange 16 to press the housing 12 into the opening 68 in the receiving member 70. Since the press-in-tools engage the retainer ring 50 during mounting of the seal assembly 40 on the housing 12 and during mounting of the housing on the receiving member 70, the flange 16 can be relatively small.

By forming the flange 16 with a relatively small outside diameter, the housing 12 can be formed with a screw machine with a minimum of waste. If desired, the housing 12 can be formed with the relatively small flange 16 by a coldheading process. Although it is preferred to form the housing 12 with an annular flange 16, the flange could be formed by a plurality, for example three, spaced apart segments on the housing 12.

In the embodiment of the invention illustrated in FIG. 1, the annular retainer ring 50 has a larger outside diameter than the annular flange 16. However, it is contemplated that the flange 16 could be formed with ears or tabs which project outward to a cylindrical outer side 74 of the flange 50 to provide additional support for the retainer ring. Regardless of the configuration of the flange 16, the seal assembly 40 is mounted on the socket housing 12 by using a press-in-tool to apply force against the retainer ring 50. In addition, the socket housing 12 is forced into the opening 68 (FIG. 2) in the receiving member 70 by the application of force to the retainer ring by a press-in-tool 66. This enables the flange 16 to be formed with any desired configuration to facilitate fabrication of the socket housing 12.

From the above description of the invention, those skilled in the art will perceive improvements, changes and modifications. Such improvements, changes and modifications within the skill of the art are intended to be covered by the appended claims.

Having described the invention, the following is claimed:

1. A ball joint assembly to be pressed into an opening in a receiving member by a press-in-tool, said ball joint assembly comprising:
   a housing defining a chamber having an opening, said housing having a flange on the outside of said housing;
   a ball stud having a ball portion disposed in said chamber and a shank portion projecting through the opening; and
   seal means for sealing the opening, said seal means including a flexible seal wall portion connected with said shank portion of said ball stud and retainer ring means for connecting said flexible seal wall portion with said housing, said retainer ring means being disposed in engagement with said flange, said retainer ring means extending outward of said flange to enable the press-in-tool to press against said retainer ring means to press said housing into the opening in the receiving member;
   said flange having an annular side surface facing toward said shank portion of said ball stud, said retainer ring means having a first annular side surface which is disposed in engagement with said annular side surface of said flange and a second annular side surface which faces toward said shank portion of said ball stud, said second annular side surface of said retainer ring means having an outside diameter which is greater than an outside diameter of said annular side surface of said flange.

2. A ball joint assembly to be pressed into an opening in a receiving member by a press-in-tool, said ball joint assembly comprising:
   a housing defining a chamber having an opening, said housing having a flange on the outside of said housing;
   a ball stud having a ball portion disposed in said chamber and a shank portion projecting through the opening; and
   seal means for sealing the opening, said seal means including a flexible seal wall portion connected with said shank portion of said ball stud and retainer ring means for connecting said flexible seal wall portion with said housing, said retainer ring means being disposed in engagement with said flange, said retainer ring means extending outward of said flange to enable the press-in-tool to press against said retainer ring means to press said housing into the opening in the receiving member;
   said retainer ring means including a rigid metal ring having a first annular side surface which is disposed adjacent to said flange and a second annular side surface which faces toward said shank portion of said ball stud, said flexible seal wall portion having a first end portion which is disposed in sealing engagement with said shank portion of said ball stud and a second end portion which is bonded to said second annular side surface of said rigid metal ring.

3. A ball joint assembly to be pressed into an opening in a receiving member by a press-in-tool, said ball joint assembly comprising:
   a housing defining a chamber having an opening, said housing having a flange on the outside of said housing;
   a ball stud having a ball portion disposed in said chamber and a shank portion projecting through the opening; and
   seal means for sealing the opening, said seal means including a flexible seal wall portion connected with said shank portion of said ball stud and retainer ring means for connecting said flexible seal wall portion with said housing, said retainer ring means being disposed in engagement with said flange, said retainer ring means extending outward of said flange to enable the press-in-tool to press against said retainer ring means to press said housing into the opening in the receiving member;
   said retainer ring means having a circular first side which has an interference fit with at least a portion of an outer side of said housing and a second side which extends radially outwardly from said circular first side, said flexible seal wall portion of said seal means having an end portion connected with said second side of said retainer ring means, said second side of said retainer ring means extending outwardly of the end portion of said flexible seal wall portion of said seal means to enable the press-in-tool to press against said second side of said retainer ring means.

4. A ball Joint assembly as set forth in claim 3 wherein the end portion of said flexible seal wall portion is bonded to said second side of said retainer ring means.

5. A method of mounting a ball joint having a ball stud extending out of a housing and a seal assembly sealing an opening in the housing through which the ball stud extends, said method comprising the steps of:
   aligning the ball joint housing with an opening in a receiving member;
   engaging the seal assembly with a tool;

pressing against the seal assembly with the tool; and transmitting force from the seal assembly to the ball joint housing to force the ball joint housing into the opening in the receiving member.

6. A method as set forth in claim 5 wherein the seal assembly includes a flexible wall portion and a retainer ring portion which connects the flexible wall portion with the housing, said step of engaging the seal assembly with a tool including engaging the retainer ring portion of the seal assembly with the tool, said step of pressing against the seal assembly with the tool includes pressing against the retainer ring portion of the seal assembly with the tool, said step of transmitting force from the seal assembly to the ball joint housing including pressing against a portion of the housing with the retainer ring portion of the seal assembly.

* * * * *